United States Patent

Naeyaert

[15] 3,689,846

[45] Sept. 5, 1972

[54] START BIT DETECTION CIRCUIT

[72] Inventor: Roger S. Naeyaert, Grosse Pointe Woods, Mich.

[73] Assignee: Burroughs Corporation, Detroit, Mich.

[22] Filed: March 30, 1971

[21] Appl. No.: 129,526

[52] U.S. Cl. ....................328/63, 307/234, 328/112, 328/165

[51] Int. Cl. ....................H03k 5/20

[58] Field of Search ........307/234; 328/63, 111, 112, 328/165

[56] References Cited

UNITED STATES PATENTS

| | | | |
|---|---|---|---|
| 2,961,609 | 11/1960 | Manving | 328/112 |
| 3,555,434 | 1/1971 | Sheen | 307/234 X |
| 3,097,340 | 7/1963 | Dobbie | 307/234 X |
| 3,437,834 | 4/1969 | Schwartz | 328/165 X |
| 2,874,217 | 2/1959 | Diehl | 328/111 X |
| 3,072,855 | 1/1963 | Chandelr | 328/165 |
| 3,354,400 | 11/1967 | Heber et al. | 328/112 X |
| 3,366,881 | 1/1968 | Malone et al. | 328/111 X |
| 3,462,740 | 8/1969 | Kennedy | 307/234 X |
| 3,535,644 | 10/1970 | Slayden et al. | 328/112 X |

*Primary Examiner*—Donald D. Forrer
*Assistant Examiner*—R. C. Woodbridge
*Attorney*—Kenneth L. Miller and Edwin W. Uren

[57] ABSTRACT

A circuit for selectively detecting a start bit in a receiver of asynchronous serial data signals wherein timing means and logical gating measure signals in a transmission medium against a time base established by the timing means. Noise signals of similar amplitude and polarity as a start bit, but of shorter duration that occur prior to a start bit are thus not recognized as true start bits.

2 Claims, 2 Drawing Figures

INVENTOR.
ROGER S. NAEYAERT
BY

START BIT DETECTION CIRCUIT

BACKGROUND OF THE INVENTION

This invention relates generally to the electrical transmission of data and more specifically to devices for synchronizing receivers of serial asynchronous signals with the data transmission frequency of those signals.

In serial asynchronous transmission of data, each bit chain or work of information consists of a predetermined number of data bits preceded by a start bit and followed by a stop bit. A receiver of such data in effect waits on-line with the transmitter until it detects a start bit of a data word. When the start bit is detected an oscillator or clock generator having a frequency equal to or a multiple of the data transmission frequency is activated. A resulting clock pulse is then gated with receiver logic to begin reading the incoming signal at predetermined intervals corresponding with the time positions of the data bits in the word. A counter of the receiver counts the predetermined number of bits contained in the word and when the final bit has been counted the receiver looks for the start bit of the next word. It is important that the receiver activates the oscillator at the proper time in relation to the incoming data signal so that the internal clock of the receiver is actuated in phase with the data signal.

A common circuit used in the prior art for detecting a start bit and activating the oscillator is comprised of a clock generator that is activated by an incoming signal having a proper amplitude and polarity. A predetermined number of cycles of the clock generator are then counted which determines a clock period. At the termination of the count period a signal is generated that is gated with the incoming signal. If the incoming signal at this subsequent time still indicates a start bit, a start pulse is generated which in turn activates the oscillator. A second incoming signal occurring before the termination of the count period does not reinitiate the count.

Assumed in the operation of such a circuit is that a noise signal has a much shorter duration than a start bit and further that the noise signal has occurred later than the count period before the occurrence of a leading edge of a true start bit. If the latter condition were not true, the logic of the prior art circuit would recognize a start bit initiated by a noise signal. Since it is equally likely that a noise signal could occur just prior to a start bit as at any other time, the imposition of the latter condition may cause untimely activation of the receiver oscillator. On the other hand, the former of these conditions (that the noise signal has a substantially shorter duration than the start bit) is known to be the usual case.

It is an object of the present invention therefore to provide a start bit detection circuit that is unaffected by the occurrence of a noise signal immediately preceding a start bit.

It is a corollary object of the present invention to provide a circuit that is continuously effective in detecting a start bit prior to the occurrence of a true start bit.

It is a related object of the invention to selectively detect a start bit in a transmission environment having noise signals of similar amplitude and polarity as the start bit but of significantly less duration.

SUMMARY OF THE INVENTION

In accordance with the invention and in satisfaction of these and other objects, a start bit detection circuit is constructed comprising a timing means that is responsive to the leading edge of an electrical signal to initiate a timed period represented by a timing pulse. The incoming signal must be of a predetermined polarity and greater than a predetermined minimum amplitude before it will activate the timing means. Such a signal could either be electrical noise or a start bit of a data word. The output or timing pulse of the timing means is coupled to a pulse shaping means which generates a spiked pulse at the trailing edge of the timing pulse. This spiked pulse is logically AND'd with the incoming signal to generate a start pulse if in fact the signal that activated the timing means was a start bit. The timing means has the characteristic of reinitiating the timed period whenever another electrical signal of proper magnitude and polarity occurs less than the duration of the time period after the signal that originally activated the timing means. Thus, if a noise signal initiates the timing means immediately prior to a data bit, the timing period is reinitiated at the beginning of the data bit. Accordingly, the circuit generates a start pulse in proper timed relationship with the incoming signal.

BRIEF DESCRIPTION OF THE DRAWINGS

In order to facilitate a more complete understanding of the invention, a detailed description of a preferred embodiment thereof will hereinafter be undertaken with reference to the drawings in which:

Referring now to FIG. 1 by characters of reference, there is shown a preferred form of the start bit detection circuit. The exemplary environment for the circuit is in a receiver of data communications, the receiver being incorporated in a station of an on-line data communications network wherein data is transmitted between the stations via telephone lines or the like. The subject circuit finds particular utility in serial asynchronous data transmission where the form of the data is characterized by a chain or word of data signals or bits preceded by a start bit and followed by a stop bit. Such data transmission is in contrast to a synchronous transmission system in which a receiver oscillator or clock generator is set at the incoming data frequency and maintained in phase therewith by continuous or periodic sampling of the incoming signal. As the data bits of each word of an asynchronous system are framed by a start and stop bit the resynchronization or phase relationship of an internal oscillator or clock is reestablished upon the receipt of each start bit.

Obviously it is important that the occurrence of a start bit is correctly determined by the receiver in order to trigger a synchronized oscillator or clock into the proper phase relationship with the incoming signal. Premature triggering of the clock may be caused by electrical noise signals in the transmission medium having sufficient amplitude and polarity to cause the start bit detection circuits of the prior art to recognize a start bit. The circuit herein disclosed discriminates between these false start bits and true ones.

Figure 1:
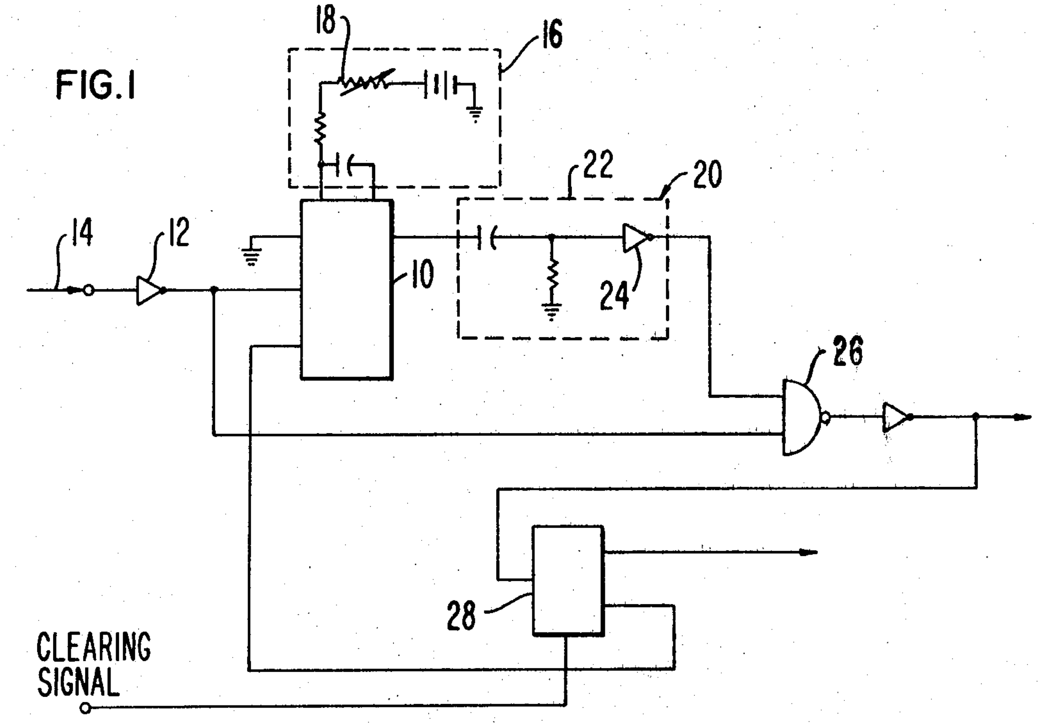
FIG. 1 is a schematic representation of the invention embodied in a preferred circuit.

As shown in FIG. 1 this advantageous result is accomplished in the present instance by coupling a timing means such as a monostable multivibrator 10 via an input inverter 12 to a transmission medium or line 14 carrying the incoming data signals from a remote transmitter to the receiver. A negative going signal on the transmission line 14 triggers the monostable multivibrator 10 to an unstable state. Triggering may occur in response to either a noise signal or a data signal. The duration of the unstable state of the monostable multivibrator 10 provides a timing pulse which effectively is used as a standard time period for determining whether or not the signal that triggered the multivibrator was noise or a start bit. The monostable multivibrator has a tunable or RC circuit 16 coupled therewith which adjustably establishes a timing pulse having a duration equal to one-half the nominal bit duration of the incoming signal. The resistive component of the RC circuit is a potentiometer 18 which permits fine adjustment of the timing pulse duration.

The output of the monostable multivibrator 10 is coupled to pulse shaping means 20 or in this instance an RC circuit. The pulse shaping means 20 generates a spiked pulse at the leading and trailing edges of the timing pulse. An inverter 24 of a well-known variety rectifies as well as inverts by chopping the spiked pulse associated with the leading edge of the timing pulse and inverting the spiked pulse associated with the trailing edge thereof. As the spiked pulse from the pulse shaping means occurs at the trailing edge of the timing pulse and the timing pulse is adjusted to one half the nominal bit duration in relation to the incoming signal the spiked pulse occurs at the nominal mid-point of a start bit.

Since the duration of an electrical noise signal in the transmission medium is relatively short compared with the duration of a data signal, this relationship is the basic premise upon which the present circuit has been designed. Pursuant to this basic premise the output from the pulse shaping means is gated by gating means 26 with the incoming signal. If the pulse that triggered the monostable multivibrator 10 is shorter than one-half the nominal bit duration, no output is generated and conversely, if it were a data bit that triggered the monostable multivibrator 10 a start pulse will be generated. The gating means 26 in the preferred design is a NAND gate which logically AND's the inputs from the inverter of the pulse shaper and the incoming data signal. The output of the NAND gate 26 is inverted in the present instance to create a start pulse of the desired polarity.

Once the start bit of a chain of data bits has been determined, means must be provided to maintain the monostable multivibrator in its quiescent state, or in other words, to inhibit the circuit from generating another pulse before the end of that particular bit chain or word. This is accomplished by the provision of a trigger inhibitor 28, which comprises a bistable element such as a conventional flip-flop. The trigger inhibitor 28 has one of its two inputs operably coupled to the output of the gating means 26 so that the generation of a start pulse will set the inhibitor to one of its two possible states. An output, providing an electrical level indicative of the state of the bistable inhibitor, is operably coupled to the timing means 10 such that it prevents the monostable multivibrator comprising the timing means from being retriggered by any subsequent electrical signals applied thereto by the transmission medium 14 after the generation of a start pulse by the gating means 26. Retriggering of the multivibrator is thus prevented until a clearing signal is applied to the second of the two inputs of the inhibitor 28, switching the latter to the second of its two possible states. The electrical level indicative of the state of the bistable inhibitor will then be such as to once again permit the multivibrator to be triggered. A clearing signal may be generated by such means as a counter which counts clock pulses occurring after the start pulse. After a predetermined number of clock pulses equal in time to the duration of a data word, the counter generates the clearing signal, thus resetting the monostable multivibrator 10 to a triggerable state awaiting the start bit of a next word.

Figure 2:
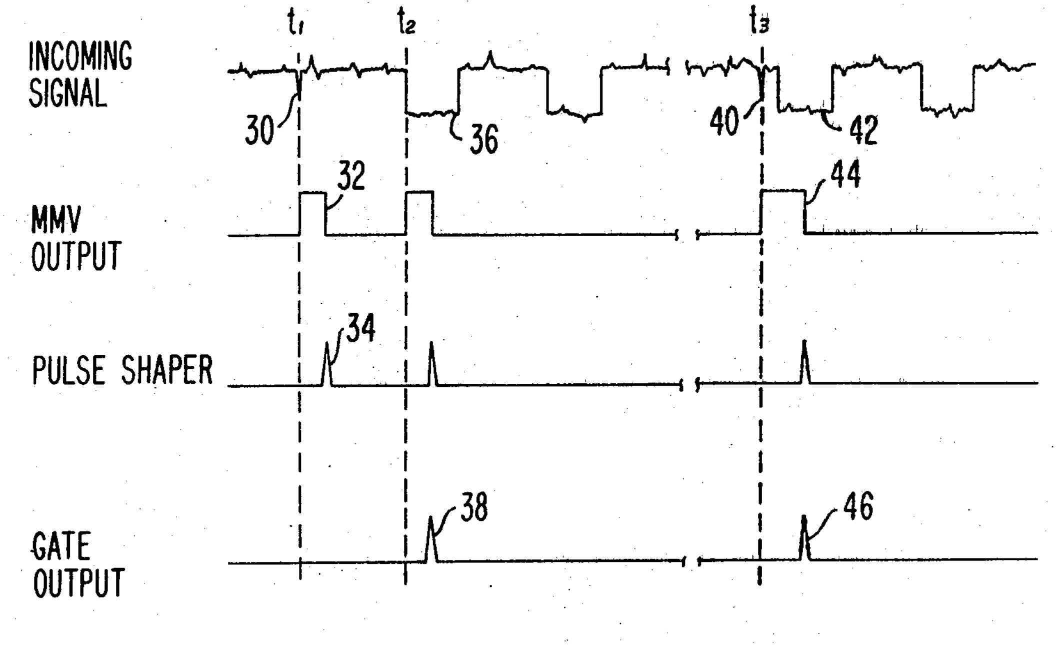
FIG. 2 is a timing diagram showing the time relationships of some of the pulses generated by the circuit.

The operation of the present circuit may be better understood with reference to the timing diagrams of FIG. 2. In the situation where a noise pulse occurs a relatively long time before a start bit, as at $t_1$, the monostable multivibrator 10 is triggered thus generating a timing pulse 32. The pulse shaping means 20 generates a spiked pulse 34 at the trailing edge of the timing pulse 32, but when the pulse shaper output is logically AND'd with the incoming signal there is no gate output and hence no start pulse. When, however, a true start bit 36 occurs, as at $t_2$, the incoming signal is of such duration that it occurs coincidentally with the output of the pulse shaping means 20 then a start pulse 38 is generated by the NAND gate 26.

A more difficult situation is presented when a noise signal occurs less than the duration of a normal timing pulse from the leading edge of a true start bit, as at $t_3$. In this situation, the monostable multivibrator 10 is triggered by the noise signal 40 and begins a timing sequence. However, when the leading edge of the true start bit 42 occurs, the timing sequence of the monostable multivibrator 10 is reinitiated consequently increasing the duration of a timing pulse 44 so that the trailing edge thereof still occurs at the midpoint of the start bit 42. It can be seen that if the monostable multivibrator 10 was not retriggerable as described, the start pulse 46 would occur at a time other than the nominal midpoint of the start bit, thus initiating the clock or oscillator of the receiver into an out-of-phase mode.

While the invention has been described with respect to a particular embodiment, there are many modifications and alternatives not truly departing from the inventive concept disclosed herein that would be apparent to one skilled in the art. Accordingly, it is intended to include within the breadth of the appended claims all such alternatives and modifications.

What is claimed is:

1. In a receiver of serial asynchronous electrical data signals, the signals being communicated to the receiver through a transmission medium containing ambient electrical noise signals having polarities identical to those of the data signals, amplitudes greater than a minimum established for the data signals and durations substantially less than a minimum established for the data signals, a circuit for selectively detecting a first data signal in a chain thereof, the circuit comprising:

timing means operably coupled to a transmission medium for initiating a timed period, represented by a timing pulse, in response to the leading edge of an electrical signal having the same polarity as a data signal and having an amplitude greater than an established data signal minimum, the timing pulse having a duration less than an established data signal minimum but greater than the duration of a typical noise signal, said timing means being a monostable multivibrator triggerable to an unstable state by an electrical signal having the same polarity as a data signal and having an amplitude greater than the established data signal minimum, said timing means also being responsive to any subsequent electrical signal occurring within the timed period to thereby extend the timing pulse one full timed period from the instant the latter electrical signal is applied to said timing means;

pulse shaping means operably coupled to said timing means for generating a pulse of relatively short duration at the trailing edge of a timing pulse initiated by said timing means;

gating means operably coupled to the transmission medium and to said pulse shaping means for generating a start pulse upon the coincidence of a signal from the transmission medium and a pulse from said shaping means, the start pulse being indicative of the receipt of the first in a chain of incoming data signals; and a trigger inhibitor responsively coupled to said gating means and operably coupled to said timing means to prevent the retriggering of said timing means subsequent to the generation of a start pulse by said gating means for a predetermined time.

2. The circuit as defined by claim 1 wherein said trigger inhibitor is a bistable element actuatable to an inhibiting state by a start pulse and to a non-inhibiting state by an externally generated clearing signal.

* * * * *